(12) United States Patent
Tsukamoto et al.

(10) Patent No.: US 11,516,401 B2
(45) Date of Patent: Nov. 29, 2022

(54) CONTROL DEVICE, SUPPORT SYSTEM, CAMERA SYSTEM, AND CONTROL METHOD AND PROGRAM

(71) Applicant: SZ DJI TECHNOLOGY CO., LTD., Shenzhen (CN)

(72) Inventors: Chihiro Tsukamoto, Shenzhen (CN); Noriyuki Aramaki, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 327 days.

(21) Appl. No.: 16/747,298

(22) Filed: Jan. 20, 2020

(65) Prior Publication Data

US 2020/0154054 A1    May 14, 2020

Related U.S. Application Data

(63) Continuation of application No. PCT/CN2017/115436, filed on Dec. 11, 2017.

(30) Foreign Application Priority Data

Jul. 21, 2017  (JP) .............................. JP2017-142183

(51) Int. Cl.
  *H04N 5/232*    (2006.01)
  *F16M 11/10*    (2006.01)
  (Continued)

(52) U.S. Cl.
  CPC ......... *H04N 5/23293* (2013.01); *F16M 11/10* (2013.01); *F16M 11/205* (2013.01);
  (Continued)

(58) Field of Classification Search
  CPC .............. B64D 47/08; B64C 2201/108; B64C 2201/027; B64C 2201/146; B64C 39/024;
  (Continued)

(56) References Cited

U.S. PATENT DOCUMENTS

2003/0001963 A1   1/2003  Masuyama et al.
2014/0270743 A1*  9/2014  Webb ................... H04N 5/2328
                                                       396/55

FOREIGN PATENT DOCUMENTS

CN       102668536 A    9/2012
CN       103984193 A    8/2014
(Continued)

OTHER PUBLICATIONS

The World Intellectual Property Organization (WIPO) International Search Report for PCT/CN2017/115436 dated Apr. 11, 2018 5 pages.

*Primary Examiner* — Xi Wang
(74) *Attorney, Agent, or Firm* — Anova Law Group, PLLC

(57) ABSTRACT

The present disclosure provides a control device. The control device is configured to control a rotation mechanism to rotatably hold a camera device. The control device includes a processor configured to execute a program to: determine a mounting state of a mounting member mounted on a support mechanism supporting the rotation mechanism; determine a rotation range of the camera device coupled to the rotation mechanism based on the mounting state of the mounting member; and control a rotation of the camera device based on the rotation range.

22 Claims, 15 Drawing Sheets

(51) Int. Cl.
*F16M 11/20* (2006.01)
*F16M 13/04* (2006.01)
*G03B 17/14* (2021.01)
*G03B 17/56* (2021.01)

(52) U.S. Cl.
CPC ............. *F16M 13/04* (2013.01); *G03B 17/14* (2013.01); *G03B 17/561* (2013.01)

(58) Field of Classification Search
CPC ........... H04N 5/23299; H04N 5/23218; H04N 5/2328; H04N 5/23222; G02B 27/646; G02B 27/644
USPC .............................................. 396/55; 348/37
See application file for complete search history.

(56) References Cited

FOREIGN PATENT DOCUMENTS

| | | |
|---|---|---|
| CN | 105090699 A | 11/2015 |
| CN | 105144695 A | 12/2015 |
| CN | 106227240 A | 12/2016 |
| CN | 106742003 A | 5/2017 |
| JP | 2007183356 A | 7/2007 |
| JP | 2008131539 A | 6/2008 |
| JP | 2010026271 A | 2/2010 |
| JP | 2014092598 A | 5/2014 |
| JP | 2015177539 A | 10/2015 |
| JP | 2016017993 A | 2/2016 |
| JP | 2016515348 A | 5/2016 |
| JP | 2017504051 A | 2/2017 |

\* cited by examiner

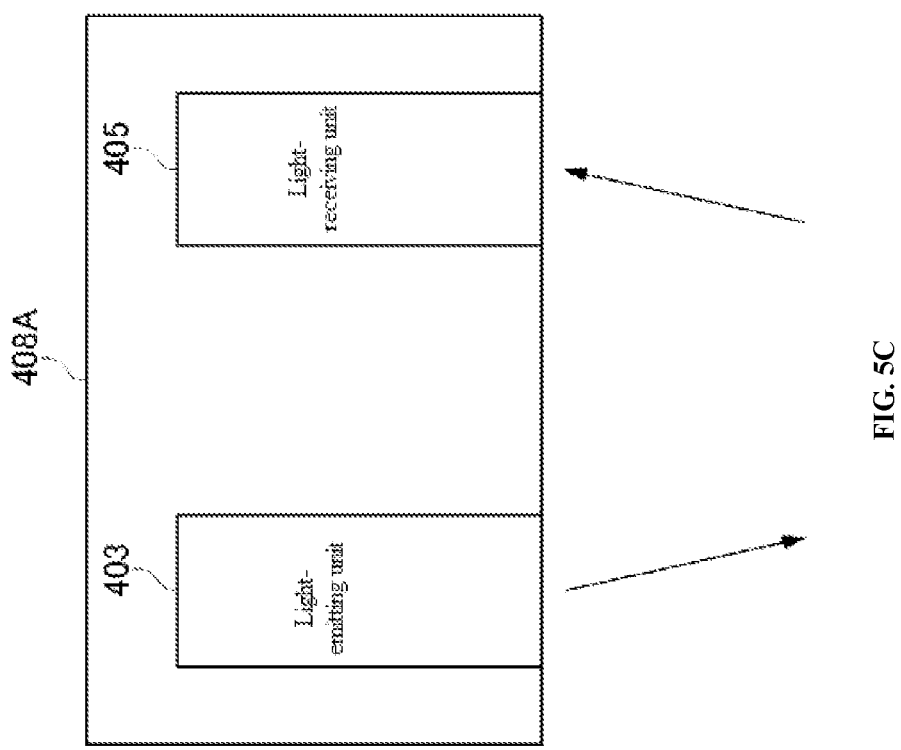

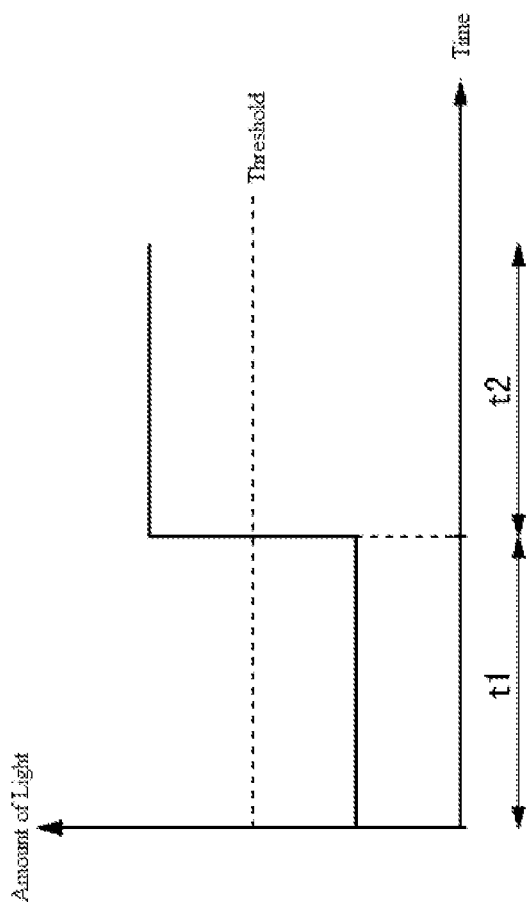

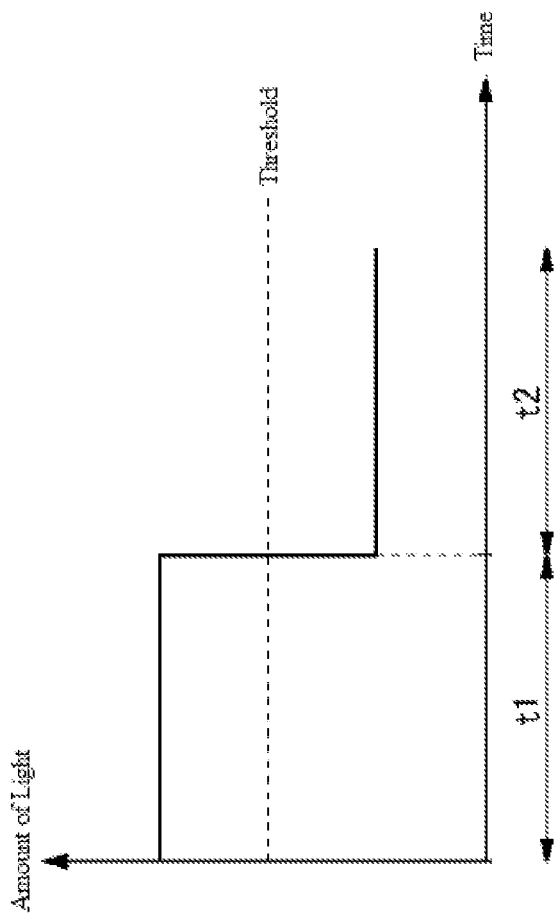

CONTROL DEVICE, SUPPORT SYSTEM, CAMERA SYSTEM, AND CONTROL METHOD AND PROGRAM

CROSS-REFERENCE TO RELATED APPLICATION

This application is a continuation of International Application No. PCT/CN2017/115436, filed on Dec. 11, 2017, which claims priority to Japanese Patent Application No. 2017-142183, filed on Jul. 21, 2017. The entire content of the two applications is incorporated herein by reference.

TECHNICAL FIELD

The present disclosure relates to a control device, a support system, a camera system, a control method, and a program.

BACKGROUND

JP 2017-504051 discloses a gimbal that can rotatably support a camera device. However, when a mounting member such as a handheld device or the like mounted on the gimbal described in JP 2017-504051 is fixed to a position on a support frame, an undesired object such as the mounting member may be caught in an image captured by the camera device or the camera device may collide with the mounting member due to the rotation of the camera device.

SUMMARY

One aspect of the present disclosure provides a control device. The control device is configured to control a rotation mechanism to rotatably hold a camera device. The control device includes a processor configured to execute a program to determine a mounting state of a mounting member mounted on a support mechanism supporting the rotation mechanism; determine a rotation range of the camera device coupled to the rotation mechanism based on the mounting state of the mounting member; and control a rotation of the camera device based on the rotation range.

Another aspect of the present disclosure provides a support system comprising a control device. The control device includes a processor configured to execute a program to: determine a mounting state of a mounting member mounted on a support mechanism supporting a rotation mechanism; determine a rotation range of an camera device based on the rotation mechanism based on the mounting state of the mounting member; and control a rotation of the camera device based on the rotation range.

Another aspect of the present disclosure provides a camera system, comprising a support system with a control device, a camera device, a support mechanism, and a mounting member. The control device includes a program configured to execute a program to: determine a mounting state of a mounting member mounted on a support mechanism supporting a rotation mechanism; determine a rotation range of an camera device based on the rotation mechanism based on the mounting state of the mounting member; and control a rotation of the camera device based on the rotation range.

Another aspect of the present disclosure provides a control method, comprising determining a mounting state of a mounting member mounted on a support mechanism supporting a rotation mechanism; determining a rotation range of a camera device coupled to the rotation mechanism based on the mounting state of the mounting member; and controlling a rotation of the camera device based on the rotation range.

BRIEF DESCRIPTION OF THE DRAWINGS

FIG. 5C is a diagram explaining the detection of the attitude of the handheld device by using the light reflector according to an embodiment of the present disclosure.

FIG. 5D is a diagram explaining the detection of the attitude of the handheld device by using the light reflector according to an embodiment of the present disclosure.

FIG. 6E is a diagram explaining the detection of the attitude of the handheld device by using the photo interrupter according to an embodiment of the present disclosure.

DETAILED DESCRIPTION OF THE EMBODIMENTS

Figure 1:
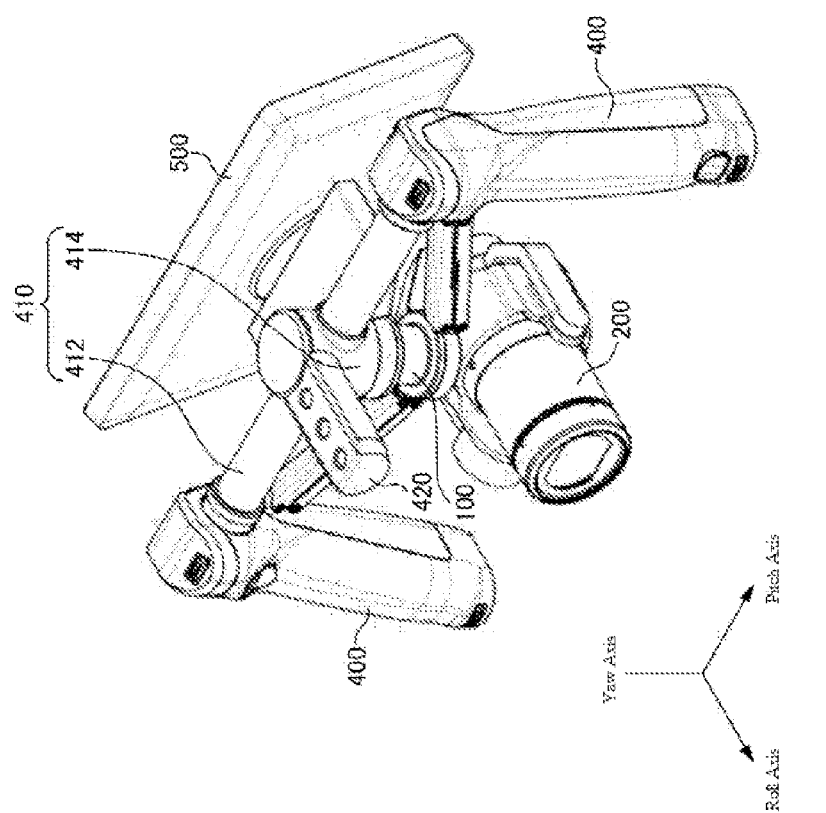
FIG. 1 is a diagram illustrating an example of an appearance of a camera system according to an embodiment of the present disclosure.

The technical solutions provided in the embodiments of the present disclosure will be described below with reference to the drawings. However, it should be understood that the following embodiments do not limit the disclosure. It will be appreciated that the described embodiments are some rather than all of the embodiments of the present disclosure. Other embodiments conceived by those having ordinary skills in the art on the basis of the described embodiments without inventive efforts should fall within the scope of the present disclosure. It should be noted that technical solutions provided in the present disclosure do not require all combinations of the features described in the embodiments of the present disclosure.

The various embodiments of the present disclosure can be described with reference to the accompanying flowcharts and block diagrams, and the blocks herein may represent (1) a state of a process of performing an operation, or (2) a part of a device having an effect of performing an operation. The specially designated stages and parts can be installed using programmable circuits and/or processors. Dedicated circuits may include digital and/or analog hardware circuits, which may include integrated circuits (ICs) and/or discrete circuits. The programmable circuit can include reconfigurable hardware circuitry, which can include logic AND, logic OR, logic XOR, logic NAND, login NOR, and other logic operations, flip-flops, registers, field programmable gate arrays (FPGAs), programmable logic arrays (PLAs), and the like.

The computer readable medium can include any tangible device that can store instructions that are executed by a suitable device. As such, a computer readable medium having instructions stored therein is provided with a product including executable instructions for forming means for performing the operations specified in the flowchart or block diagram. As an example, the computer readable medium may include an electronic storage medium, a magnetic storage medium, an optical storage medium, an electromagnetic storage medium, a semiconductor storage medium, or the like. As a more specific example, the computer readable medium may include a floppy (registered trademark) disk, a hard disk, a random access memory (RAM), a read only memory (ROM), an erasable programmable read only memory (EPROM or flash memory), electrically erasable programmable read only memory (EEPROM), static random access memory (SRAM), compact disc read only memory (CD-ROM), digital versatile disc (DVD), Blu-ray® disc, memory stick, integrated circuit card, and the like.

The computer readable instructions can include any of the source code or object code described in any combination of one or more programming languages. The source code or object code can include an existing procedural programming language. Existing procedural programming languages may be assembler instructions, instruction set architecture (ISA) instructions, machine instructions, machine dependent instructions, microcode, firmware instructions, state setting data, Smalltalk, JAVA (registered trademark), object-oriented programming language such as C++, and "C" programming language or the same programming language. The computer readable instructions may be provided locally or via a wide area network (WAN), such as a local area network (LAN), the Internet, to a processor or programmable circuit of a general purpose computer, special purpose computer, or other programmable data processing apparatus. The processor or programmable circuitry can execute computer readable instructions to form a means for performing the operations specified in the flowcharts or block diagrams. Examples of the processor include a computer processor, a processing unit, a microprocessor, a digital signal processor, a controller, a microcontroller, and the like.

FIG. 1 is a diagram illustrating an example of an appearance of a camera system 10 according to an embodiment of the present disclosure. As shown in FIG. 1, the camera system 10 includes a gimbal 100, a camera device 200, a support mechanism 410, a pair of handheld units 400, a handheld device 420, and a display device 500.

The camera device 200 may be an imaging camera for acquiring images of an object included in a desired camera range. The gimbal 50 may be used to support the camera device 100 in a rotatable manner. In some embodiments, the gimbal 50 may be an example of a rotating mechanism and a support mechanism. For example, the gimbal 50 can rotatably support the camera device 200 centering on the yaw axis by using an actuator. Further, using the actuator, the gimbal 100 can further rotatably support the camera device 200 centering on the pitch axis and the roll axis, respectively. In some embodiments, the gimbal 100 can change the attitude of the camera device 200 by rotating the camera device 200 around at least one of the yaw axis, the pitch axis, and the roll axis.

The support mechanism 410 can detachably support the gimbal 100. The support mechanism 410 may have a T-shape and include a rod member 412 extending in the pitch axis direction and a rod member 414 extending from a central portion of the rod-shaped member 412 in the yaw axis direction. The pair of handheld units 400 may be rotatably mounted on the support mechanism 410, and the pair of handheld units 400 may be attached to both ends of the rod member 412 with the gimbal 100 disposed therebetween. In some embodiments, the pair of handheld units 400 may be detachably disposed on the support mechanism. The gimbal 100 may be detachably mounted on one end of the rod member 414. The handheld device 420 may be disposed at the other end of the rod member 414 extending in the roll axis direction. The display device 500 may be disposed on the rod member 414. In particular, the display device 500 may be mounted on the rod member 414 on the side opposite to the side on which the lens unit of the camera device 200 may be disposed. In some embodiments, the display device 500 may be mounted on the rod member 414 on a back side opposite to a front side on which the lens unit of the camera device 200 may be disposed. In addition, the display device 500 may be detachably disposed on the support mechanism 410.

The camera system 10 may be used in a state where the display device 500 may be detached from the support mechanism 410. In some embodiments, the display device may be disposed on the support mechanism 410 at an angle that can adjust a display surface. The display device 500 may be rotatably disposed on the support mechanism 410 centering on the pitch axis. The support mechanism and the display device 500 may be an example of the mounting members being mounted on the support mechanism 410. In addition, in the present embodiment, the display device 500 may be mounted on the support mechanism 410 as an individual component separated from the camera device 200. However, the display device 500 may be provided as a part of the camera device 200. In some embodiments, the display device 500 may be supported by the support mechanism 410 through the camera device 200. Further, the display device 500 may be integrally provided on the camera device 200. In addition, the display device 500 may be disposed on the camera device 200 with respect to an angle at which the camera device 200 can adjust the display surface.

Figure 2:
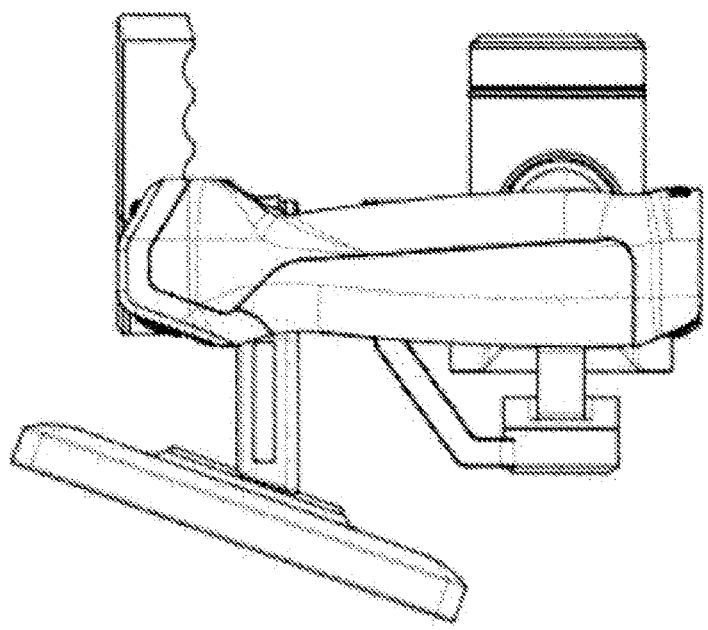
FIG. 2 is a diagram illustrating an example of a side view of the camera system in a handheld mode according to an embodiment of the present disclosure.
Figure 3:
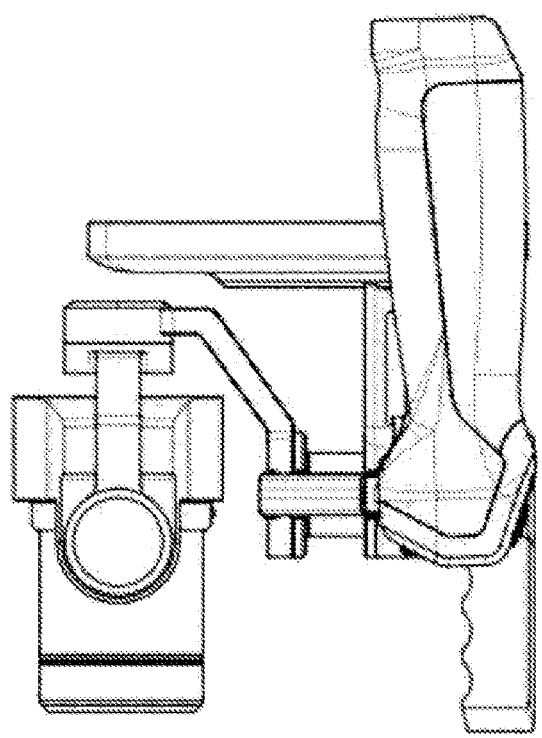
FIG. 3 is a diagram illustrating an example of a side view of the camera system in a fixed mode according to an embodiment of the present disclosure.

In the camera system 10 described above, the attitude of the pair of handheld units 400 can be adjusted based on a shooting mode. FIG. 2 is a diagram illustrating an example of the pair of handheld units 400 being in a handheld mode according to an embodiment of the present disclosure. In the handheld mode, the pair of handheld units 400 may be fixed to the support mechanism 410 in an attitude toward the yaw axis. The user may arrange the camera device 200 to be on the lower side in the vertical direction with respect to the gimbal 100 and hold the pair of handheld units 400 with both hands for shooting. FIG. 3 is a diagram illustrating an example of the pair of handheld units 400 being in a fixed mode according to an embodiment of the present disclosure. In the fixed mode, the pair of handheld units 400 may be fixed to the support mechanism in an attitude toward the roll axis direction. The user may arrange the camera device 200 to be on the upper side in the vertical direction with respect to the gimbal 100 and arrange the camera system 10 on a table or the like for shooting. For example, the user may arrange the camera system 10 on the table and instruct the camera system 10 to perform an attitude adjustment of the camera device 200, an imaging condition adjustment of the camera device 200, a shooting, and the like by using a remote operation terminal. In addition, in the fixed mode, the pair of handheld units 400 can be detached from the support mechanism 410.

For example, when the user performs shooting in the handheld mode and the camera device 200 is rotated to change the attitude of the camera device 200, the camera device 200 may collide with the pair of handheld units 400, or the pair of handheld units 400 may be captured in an image captured by the camera device 200, or the user may be captured in the image. As such, in the camera system 10 of the present embodiment, the rotation range of the camera device 200 may be set based on the attitude of the pair of handheld units 400.

Figure 4:
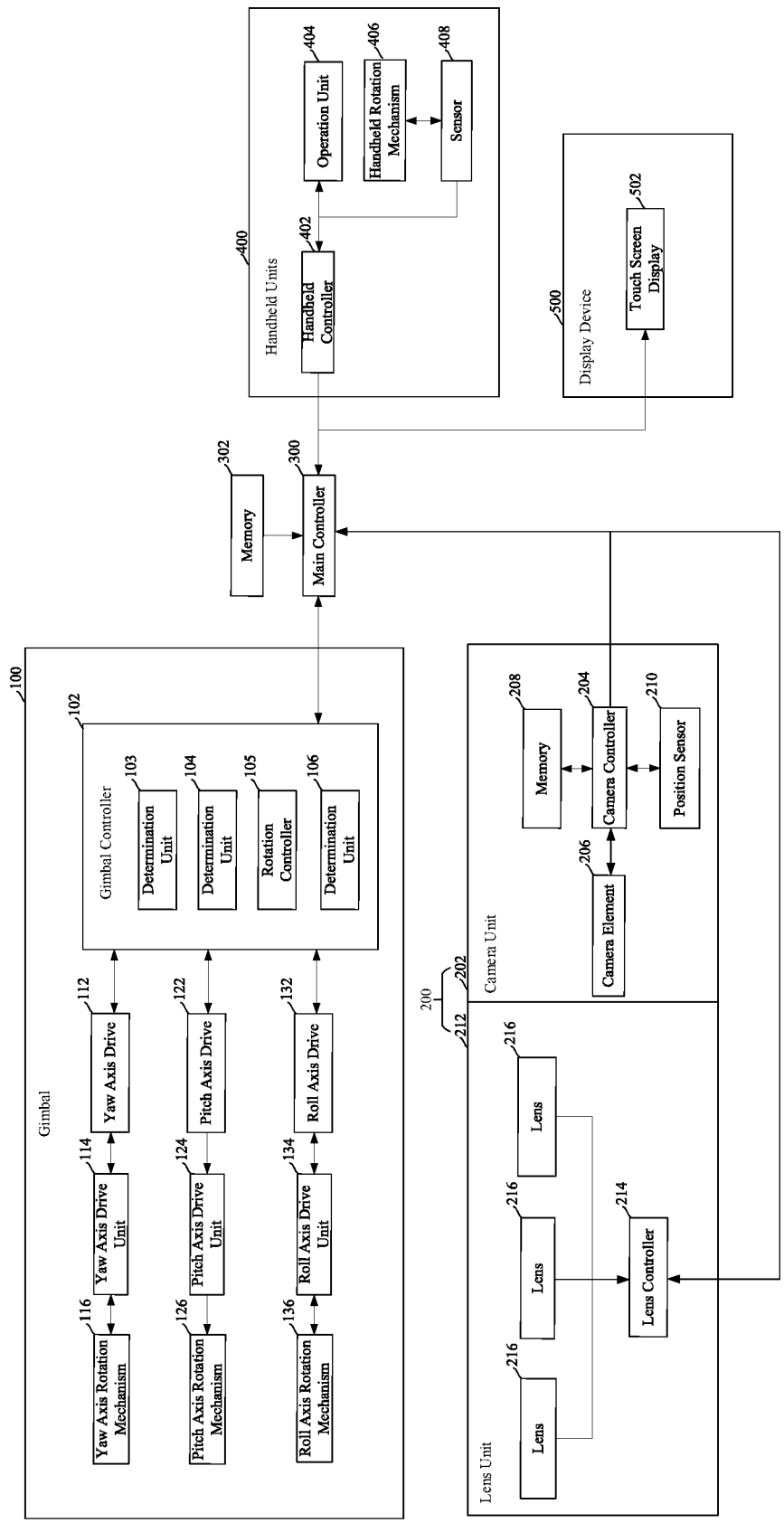
FIG. 4 is a diagram illustrating an example of functional blocks of the camera system according to an embodiment of the present disclosure.

FIG. 4 is a diagram illustrating an example of functional blocks of the camera system 10 according to an embodiment of the present disclosure. As shown in FIG. 4, the camera system 10 includes a gimbal 100, a camera device 200, a main controller 300, a memory 302, a pair of handheld units 400, and a display device 500.

The main controller 300 may be configured to control the entire camera system 10. The main controller 300 may include a microprocessor such as a central processing unit (CPU) or a microprocessor (MPU), or a microcontroller (MCU) or the like. The memory 302 may be used to store programs needed for the main controller 300 to control the gimbal 100, the camera device 200, and the pair of handheld units 400. Further, the memory 302 may be a computer readable recording medium, and may include at least one of flash memories such as a SRAM, a DRAM, an EPROM, an EEPROM, and a USB memory. In some embodiments, the memory 302 may be disposed on the support mechanism 410. In other embodiments, the memory 302 may be configured to be detachable from the support mechanism 410.

As shown in FIG. 4, the gimbal 100 includes a gimbal controller 102, a yaw axis drive 112, a pitch axis drive 122, a roll axis drive 132, a yaw axis drive unit 114, a pitch axis drive unit 124, a roll axis drive unit 134, a yaw axis rotation mechanism 116, a pitch axis rotation mechanism 126, and a roll axis rotation mechanism 136.

The yaw axis rotation mechanism 116 may be configured to rotate the camera device 200 around the yaw axis; the pitch axis rotation mechanism 126 may be configured to rotate the camera device 200 around the pitch axis, and the roll axis rotation mechanism 136 may be configured to rotate the camera device 200 around the roll axis. The gimbal controller 102 may output an operation instruction indicating the respective rotation angles to the yaw axis drive, the pitch axis drive 122, and the roll axis drive 132 based on the operation instruction from the gimbal 100 of the main controller 300. The yaw axis drive 112, the pitch axis drive 122, and the roll axis drive 132 may respectively drive the yaw axis drive unit 114, the pitch axis drive unit 124, and the roll axis drive unit 134 based on the operation instruction indicating the rotation angles. As such, the yaw axis rotation mechanism 116, the pitch axis rotation mechanism 126, and the roll axis rotation mechanism 136 may be driven to rotate by the yaw axis drive unit 114, the pitch axis drive unit 124, and the roll axis drive unit 134 to change the attitude of the camera device 200.

As shown in FIG. 4, the camera device 200 includes a camera unit 202 and a lens unit 212. The camera unit 202 includes a camera controller 204, a camera element 206, a memory 208, and a position sensor 210. The camera controller 204 may include a microprocessor such as a central processing unit (CPU) or a microprocessor (MPU), or a microcontroller (MCU) or the like. The camera controller 204 may be configured to control the camera unit 202 based on an operation instruction of the camera unit 202 from the main controller 300. The memory 208 may be a computer readable recording medium, and may include at least one of flash memories such as a SRAM, a DRAM, an EPROM, an EEPROM, and a USB memory. In some embodiments, the memory 208 may be disposed in the housing of the camera device 200. In other embodiments, the memory 208 may be configured to be detachable from the housing of the camera device 200.

The camera element 206 may be configured to generate image data of an optical image formed by the lens unit 212 and output the image data to the camera controller 204. The camera controller 204 may store the image data output from the camera element 206 in the memory 208. Further, the camera controller 204 may output and store the image data in the memory 302 through the main controller 300. The position sensor 210 may be configured to detect a state of the attitude of the camera device 200. Further, the position sensor 210 may be configured to detect the direction of gravity with respect to the camera device 200. In some embodiments, the position sensor 210 may be an acceleration sensor or a three-axis acceleration sensor.

As shown in FIG. 4, the lens unit 212 includes a lens controller 214 and a plurality of lenses 216 that may be disposed inside a lens barrel of the lens unit 212. In some embodiments, the plurality of lenses 216 may function as a zoom lens or a focus lens. At least a portion or all of the plurality of lenses 216 may be configured to be movable along an optical axis. In some embodiments, the lens unit 212 may be an interchangeable lens that may be detachable with respect to the camera unit 202. In some embodiments, the lens controller 214 may cause one or more lenses 216 to move along the direction of the optical axis based on a lens control instruction from the main controller 300. For example, a lens control instruction may be a zoom control instruction or a focus control instruction.

As shown in FIG. 4, the display device 500 includes a touch screen display 502. The display device 500 may be configured to display an image captured by the camera device 200 on the touch screen display 502. The display device 500 can display a setting screen for setting various operating conditions of the gimbal 100 and the camera device 200 on the touch screen display 502. In addition. The user can instruct the operation of the gimbal 100 and the camera device 200 through the touch screen display 502.

As shown in FIG. 4, the pair of handheld units 400 includes a handheld controller 402, an operation unit 404, a handheld rotation mechanism 406, and a sensor 408. The handheld controller 402 may include a microprocessor such as a central processing unit (CPU) or a microprocessor (MPU), or a microcontroller (MCU) or the like. The operation unit 404 may be a user interface including buttons and switches for instructing the operation of the gimbal 100 and the camera device 200. In some embodiments, the operation unit 404 may be configured to output the operation instruction of the gimbal 100 and camera device 200 from the user to the handheld controller 402. The sensor 408 may be configured to detect a mounting state of the pair of handheld units 400. Further, the sensor 408 may be configured to detect the attitude of the pair of handheld units 400. In some embodiments, the sensor 408 may be a light reflector, a photo interrupter, or a rotary encoder.

Figure 5A:
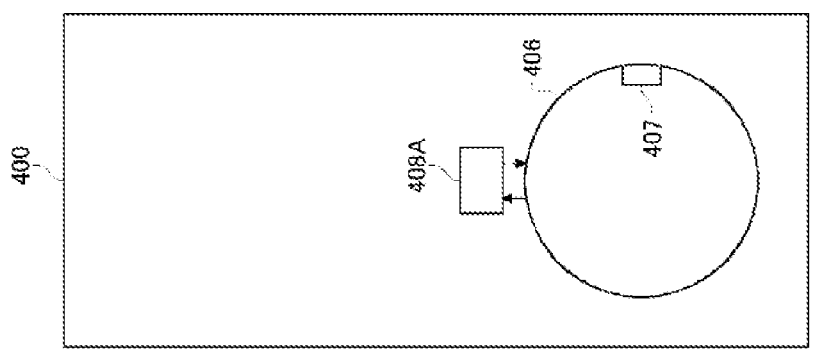
FIG. 5A is a diagram explaining a detection of an attitude of a handheld device by using a light reflector according to an embodiment of the present disclosure.
Figure 5A:
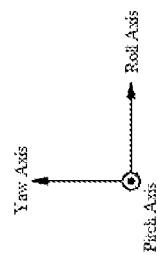
Figure 5B:
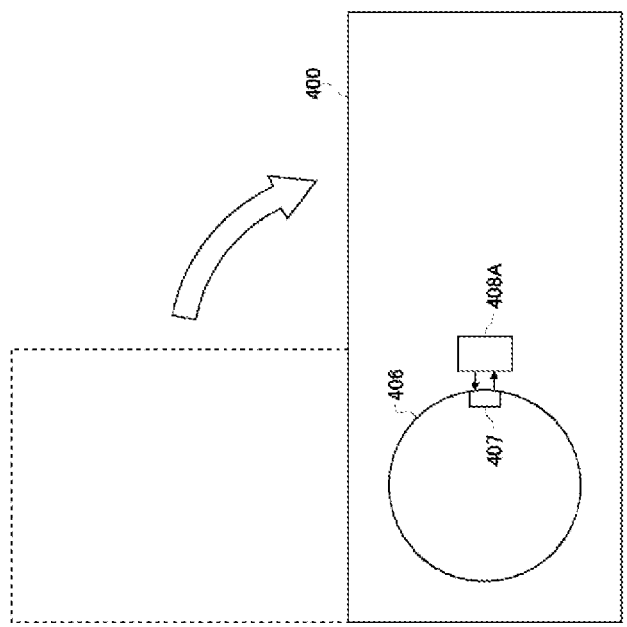
FIG. 5B is a diagram explaining the detection of the attitude of the handheld device by using the light reflector according to an embodiment of the present disclosure.
Figure 5B:
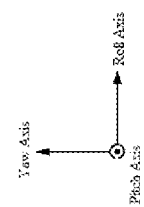

FIG. 5A, FIG. 5B, FIG. 5C, and FIG. 5D are diagrams for explaining the detection of the attitude of the pair of handheld units 400 by using a light reflector 408A. The light reflector 408A may be an example of the sensor 408. The light reflector 408A includes a light-emitting unit 403 configured to emit light such as an infrared LED, and a light-receiving unit 405 configured to receive the reflected light of the light emitted from the light-emitting unit 403. In some embodiments, the handheld rotation mechanism 406 may include a reflector 407. When the pair of handheld units 400 is in an attitude toward the roll axis direction, the reflector 407 may be disposed opposite to the light reflector 408A. On one hand, as shown in FIG. 5A, when the pair of handheld units 400 is in an attitude toward the yaw axis direction, the reflector 407 may not be present at a position opposite to the light reflector 408A. As such, as shown in a time period t1 in FIG. 5D, the amount of light of the reflected light of the light from the light-emitting unit 403 received by the light-receiving unit 405 of the light reflector 408A may be less than a predetermined threshold. On the other hand, as shown in FIG. 5B, when the pair of handheld units 400 is in an attitude toward the roll axis direction, the reflector 407 may be present at a position opposite to the light reflector 408A. As such, as shown in a time period t2 in FIG. 5D, the amount of light of the reflected light of the light from the light-emitting unit 403 received by the light-receiving unit 405 of the light reflector 408A may be greater than or equal to the predetermined threshold. That is, the attitude state of the pair of handheld units 400 may be determined based on the magnitude of the amount of light received by the light-receiving unit 405 of the light reflector 408A. In addition, the reflector 407 may also be disposed at a position opposite to the light reflector 408A when the pair of handheld units 400 is facing the yaw axis direction.

Figure 6A:
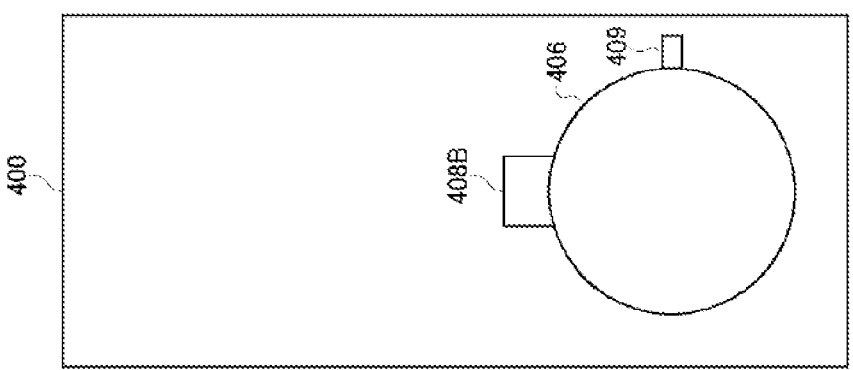
FIG. 6A is a diagram explaining the detection of the attitude of the handheld device by using a photo interrupter according to an embodiment of the present disclosure.
Figure 6A:
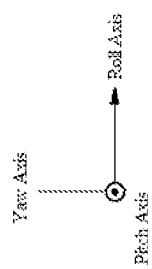
Figure 6B:
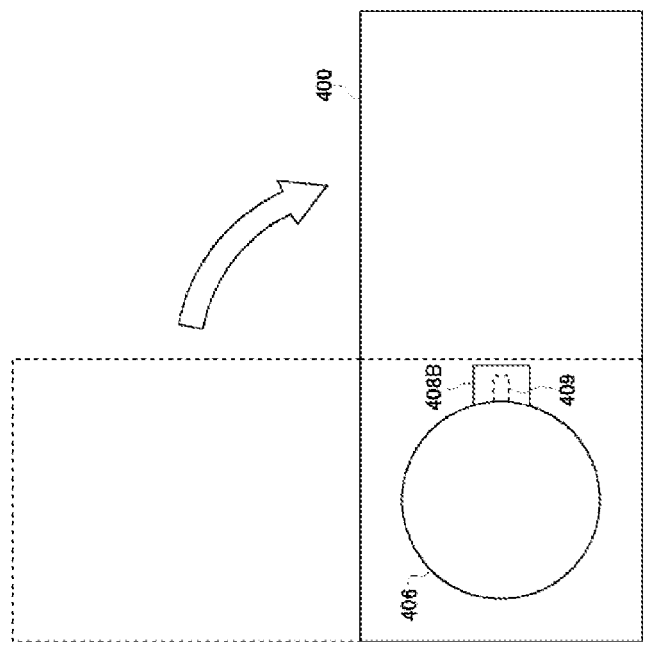
FIG. 6B is a diagram explaining the detection of the attitude of the handheld device by using the photo interrupter according to an embodiment of the present disclosure.
Figure 6C:
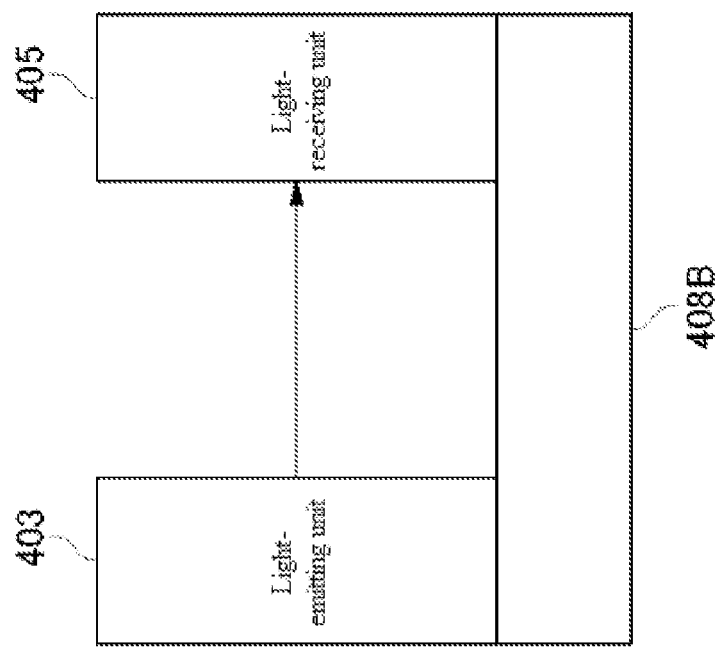
FIG. 6C is a diagram explaining the detection of the attitude of the handheld device by using the photo interrupter according to an embodiment of the present disclosure.
Figure 6D:
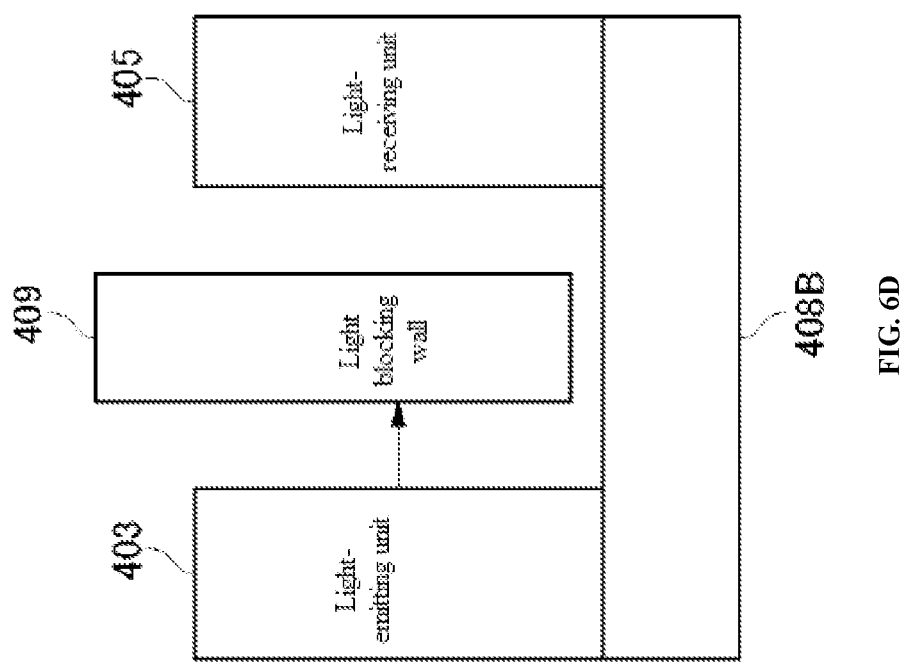
FIG. 6D is a diagram explaining the detection of the attitude of the handheld device by using the photo interrupter according to an embodiment of the present disclosure.

FIG. 6A, FIG. 6B, FIG. 6C, FIG. 6D, and FIG. 6E are diagrams for explaining the detection of the attitude of the pair of handheld units 400 by using a photo interrupter 408B. The photo interrupter 408B may be an example of the senor 408. The photo interrupter 408B includes a light-emitting unit 403 configured to emit light such as an infrared LED, and a light-receiving part 405 disposed opposite to the light-emitting unit 405 and configured to receive light emitted from the light-emitting unit 403. A light blocking wall 409 may be disposed between the light-emitting unit 403 and the light-receiving unit 405 such that the light-receiving unit 405 may not receive light from the light-emitting unit 403. In some embodiments, the handheld rotation mechanism 406 may include the light blocking wall 409. In some embodiments, when the pair of handheld units 400 is in an attitude toward the roll axis direction, the light blocking wall 409 may be disposed at a position between the light-emitting unit 403 and the light-receiving unit 405 of the photo interrupter 408B. As shown in FIG. 6A, when the pair of handheld units 400 is in an attitude toward the yaw axis direction, the light blocking wall 409 may not be present between the light-emitting unit 403 and the light-receiving unit 405. As such, as shown in a time period t1 in FIG. 6E, the amount of light of the light received by the light-receiving part 405 of the photo interrupter 408B from the light-emitting unit 403 may be greater than or equal to a predetermined threshold. In some embodiments, as shown in FIG. 6B, when the pair of handheld units 400 is in an attitude toward the roll axis direction, the light blocking wall 409 may be disposed at a position between the light-emitting unit 403 and the light-receiving unit 405. As such, as shown in a time period t2 in FIG. 6E, the amount of light of the light received by the light-receiving part 405 of the photo interrupter 408B from the light-emitting unit 403 may be less than the predetermined threshold. That is, the attitude state of the pair of handheld units 400 may be determined based on the magnitude of the amount of light received by the light-receiving part 405 of the photo interrupter 408B. In addition, the light blocking wall 409 may be disposed at a position between the light-emitting unit 403 and the light-receiving unit 405 when the pair of handheld units 400 is facing the roll axis direction.

In the camera system 10 described above, in order to determine the rotation range of the camera device 200 based on the mounting state of the pair of handheld units 400, the gimbal controller 102 may include a determination unit 103, a determination unit 104, a rotation controller 105, and a determination unit 106.

The determination unit 103 may be configured to determine the mounting state of the pair of handheld units 400 mounted on the support mechanism 410 for supporting the gimbal 100. Further, the determination unit 103 may be configured to determine the mounting state of the pair of handheld units 400 based on a detection signal from the sensor 408.

In some embodiments, the determination unit 103 may be configured to determine that the pair of handheld units 400 is being supported with respect to the support mechanism 410 in an attitude toward the yaw axis direction or the roll axis direction as the mounting state of the pair of handheld units 400. Using the attitude toward the yaw axis direction as an example of a first attitude, and the attitude toward the roll axis direction as an example of a second attitude. In the handheld mode, the pair of handheld units 400 may be in a state of an attitude facing toward the yaw axis direction. In the fixed mode, the pair of handheld units 400 may be in a state of an attitude facing toward the yaw axis direction. The pair of handheld units 400 may be supported by the support mechanism 410 in an attitude facing toward an arbitrary direction between the yaw axis direction and the roll axis direction. The determination unit 103 may be configured to determine that the pair of handheld units 400 is being supported by the support mechanism 410 facing toward any direction between the yaw axis direction and the roll axis direction as the mounting state of the pair of handheld units 400.

In some embodiments, the determination unit 103 may be configured to determine whether the pair of handheld units is being mounted on the support mechanism 410. More specifically, the determination unit 103 may be configured to determine that the pair of handheld units 400 is being mounted on the support mechanism 410 when the pair of handheld units is mounted on the support mechanism 410 in an attitude facing toward the yaw axis direction. In some embodiments, in the handheld mode, the pair of handheld units 400 may be in a state of an attitude facing toward the yaw axis direction. In some embodiments, in the fixed mode, the pair of handheld units 400 may be in a state of not being mounted on the support mechanism 410.

The determination unit 104 may be configured to determine the rotation range of the camera device 200 based on the gimbal 100 based on the mounting state of the pair of handheld units 400 determined by the determination unit 103. In some embodiments, the determination unit 104 may be configured to determine the rotation range of the camera device 200 centering on the yaw axis based on the mounting state of the pair of handheld units 400. Further, the determination unit 104 may be configured to determine the rotation range of the camera device 200 centering on the pitch axis based on the mounting state of the pair of handheld units 400. When the pair of handheld units 400 is in a state of an attitude facing toward the yaw axis direction, the determination unit 104 may determine the rotation range of the camera device 200 centering on the yaw axis to be, for example, 120°, 140°, or 160°. For example, the determination unit 104 may set the angle of the camera device 200 facing toward the roll axis direction 0° and determine the rotation range, such as ±60°, ±70°, or ±80°. When the pair of handheld units 400 is in a state of an attitude facing toward the roll axis direction, the determination unit 104 may determine the rotation range of the camera device 200 centering on the yaw axis to be, for example, 320°, 340°, or 360°. In some embodiments, an acceptable rotation range may be determined in advance based on the size of the camera device 200, the size of the interchangeable lens, or the size of the gimbal 100.

In some embodiments, when the pair of handheld units 400 is in a state of an attitude facing toward the yaw axis direction, that is, in the handheld mode, the determination unit 104 may determine the rotation range of the camera device 200 centering on the pitch axis to be, for example, 50°, 60°, or 70°. Further, when the pair of handheld units 400 is in a state of an attitude facing toward the roll axis direction, that is, in the fixed mode, the determination unit 104 may determine the rotation range of the camera device 200 centering on the pitch axis to be, for example, 90°, 120°, 150°, or 180°.

In some embodiments, the pair of handheld units 400 may also be mounted in the handheld mode and removed in the fixed mode. As such, the determination unit 104 may determine the rotation range of the camera device 200 centering on the yaw axis to be, for example, 120°, 140°, or 160°, when the pair of handheld units 400 is mounted on the support mechanism 410. When the pair of handheld units 400 detached from the support mechanism 410, the determination unit 104 may determine the rotation range of the camera device 200 centering on the yaw axis to be, for example, 320°, 340°, or 360°. Further, the determination unit 104 may determine the rotation range of the camera device 200 centering on the pitch axis to be, for example, 50°, 60°, or 70°, when the pair of handheld units 400 is mounted on the support mechanism 410. Furthermore, the determination unit 104 may determine the rotation range of the camera device 200 centering on the pitch axis to be, for example, 90°, 120°, 150°, or 180°, when the pair of handheld units 400 is detached from the support mechanism 410.

The rotation controller 105 may be configured to control the rotation of the camera device 200 based on the gimbal 100 based on the rotation range determined by the determination unit 104. More specifically, the rotation controller 105 may be configured to control the rotation of the camera device based on the gimbal 100 such that the camera device 200 may rotate within the rotation range determine by the determination unit 104.

Therefore, by adjusting the rotation range of the camera device 200 based on the mounting state of the pair of handheld units 400, it may be possible to prevent the camera device 200 from colliding with the pair of handheld units 400, or the pair of handheld units 400 being captured in an image captured by the camera device 200, or the user being captured in the image.

In the previous description, as an indicator for determining the rotation range of the camera device 200, the mounting state of the pair of handheld units 400 has been described as an example. However, the indicator for determining the rotation range of the camera device 200 is not limited to the mounting state of the pair of handheld units 400. For example, the determination unit 104 may determine the rotation range of the camera device 200 based on, for example, the mounting state of the display device 500. In some embodiments, the display device 500 may be disposed on the support mechanism 410 at an angle such that the display surface may be adjusted. As such, depending on the angle of the display device 500, the camera device may be caused to collide with the pair of handheld units 400, or the display device 500 may be captured in an image captured by the camera device 200. Therefore, the determination unit 104 may be configured to determine the rotation range of the camera device 200 based on the mounting state of the display device 500. As such, it may be possible to prevent the camera device 200 from colliding with the pair of handheld units 400 or the display device 500 being captured in the image captured by the camera device 200.

In some embodiments, the determination unit 104 may be configured to determine the rotation range of the camera device 200 based on the mounting state of the pair of handheld units 400 and the mounting state of the display device 500. More specifically, the determination unit 104 may be configured to determine the rotation range of the camera device 200 based on the mounting state of the pair of handheld device 400 and the angle of the display surface of the display device 500. Further, the determination unit 104 may be configured to determine the rotation range of the camera device 200 based on the mounting state of the pair of handheld device 400 and whether or not the display device 500 is mounted on the support mechanism 410.

The lens unit 212 being disposed on the camera device 200 may be an interchangeable lens that may be detachably disposed on the camera unit 202. The size of the interchangeable lens may vary depending on the type of the interchangeable lens. If the types of the lens unit 212 are different, then the rotation range to prevent collision or capturing the camera device 200 in the image may be different. As such, the determination unit 103 may be further configured to determine the type of the lens unit 212 mounted on the camera device 200, that is, the type of the interchangeable lens. In some embodiments, the determination unit 103 may be configured to acquire identification information identifying the lens unit 212 from the memory of the lens unit 212 and determine the type of the lens units 212 based on the identification information. The determination unit 104 may be further configured to determine the rotation range of the camera device 200 based on the type of the lens unit 212. In some embodiments, the determination may determine the rotation range of the camera device 200 based on the mounting state of the pair of handheld device 400 and the type of the lens unit 212. For example, the determination unit 104 may be configured to determination the rotation range of the camera device 200 such that the longer the length of the lens unit 212 in the optical axis is, the narrower the rotation range of the camera device 200 may be.

The gimbal 100 may be detachably mounted on the support mechanism 410, and different types of gimbals 100 may be mounted on the support mechanism 410. If the type of the gimbal 100 is different, the rotation range to prevent the collision or the camera device 200 being captured may be different. As such, the determination unit 103 may be configured to determine the type of gimbal 100 being mounted on the support mechanism 410. The determination unit 104 may be further configured to determine the rotation range of the camera device 200 based on the type of the gimbal 100. In addition, the determination unit 103 may be configured to acquire identification information identifying the gimbal 100 from the memory of the gimbal 100 and determine the type of gimbal 100 based on the identification information. In some embodiments, even if the types of lens unit 212 are the same, if the type of the gimbal 100 mounted on the support mechanism 410 is different, the rotation range to prevent the collision or the camera device 200 being captured may be different. As such, the determination unit 104 may be further configured to determine the rotation range of the camera device 200 based on at least one of the type of the lens unit 212 and the type of the gimbal 100. In some embodiments, the determination unit 104 may be configured to determine the rotation range of the camera device 200 based on the combination of the mounting state of the pair of handheld units 400, the type of the lens unit 212, and the type of the gimbal 100. Further, the determination unit 104 may be configured to determine the rotation range of the camera device 200 based on the combination of the mounting state of the pair of handheld units 400, the mounting state of the display device 500, the type of the lens unit 212, and the type of the gimbal 100.

The length of the lens unit 212 may be different based on the zoom position of the zoom lens included in the lens unit 212. That is, depending on the zoom position of the zoom lens, the rotation range to prevent the collision or the camera device 200 being captured may be different. As such, the determination unit 103 may be configured to determine the zoom position of the zoom lens. Further, the determination unit 103 may acquire information of the zoom position of the zoom lens through the lens controller 220 and determine the position of the zoom lens based on the acquired information. The determination unit 104 may be further configured to determine the rotation range of the camera device based on the position of the zoom lens. In some embodiments, the determination unit 104 may be configured to determine the rotation range of the camera device 200 based on the combination of the mounting state of the pair of handheld units 400, the type of the lens unit 212, and the position of the zoom lens. Further, the determination unit 104 may be configured to determine the rotation range of the camera device 200 based on the combination of the mounting state of the pair of handheld units 400, the type of the lens unit 212, the type of the gimbal 100, and the position of the zoom lens.

In some embodiments, even if the mounting state of the pair of handheld units 400 or the display device 500 is the same, the rotation range of the camera device 200 to prevent collision or the camera device being captured may be different based on the direction of gravity with respect to the camera device 200. For example, the top surface of the camera device 200 may be a surface facing the support mechanism 410, and the bottom surface of the camera device 200 may be a surface opposite to the surface facing the support mechanism 410. As such, when the attitude of the camera device is in the state shown in FIG. 2, the direction of gravity with respect to the camera device 200 may be a direction in which the bottom surface of the camera device 200 is positioned on the lower side in the vertical direction. Further, when the attitude of the camera device is in the state shown in FIG. 3, the direction of gravity with respect to the camera device 200 may be a direction in which the top surface of the camera device 200 is positioned on the lower side in the vertical direction. For example, in the handheld mode, in addition to the case where the user may perform imaging in the direction in which the bottom surface of the camera device 200 is position on the lower side in the vertical direction, the case where imaging is performed in the direction in which the top surface of the camera device 200 is position on the lower side in the vertical direction may also need to be considered. When the user is performing imaging in the direction in which the bottom surface of the camera device 200 is positioned on the lower side in the vertical direction, if the rotation range of the camera device 200 centering on the pitch axis is big, the user's foot may be captured. In addition, when the user is performing imaging in the direction in which the top surface of the camera device 200 is positioned on the lower side in the vertical direction, if the rotation range of the camera device 200 centering on the pitch axis is big, the user's head may be captured. Further, depending on the direction of gravity with respect to the camera device 200, the rotation range in which the camera device may be captured may be different. As such, the determination unit 106 may be configured to determine the direction of gravity with respect to the camera device 200. The determination unit 106 may determine the direction of gravity with respect to the camera device 200 based on the detection signal from the position sensor 210 of the camera device 200. The determination unit 104 may be further configured to determine the rotation range of the camera device 200 based on the direction of gravity of the camera device determined by the determination unit 106. In some embodiments, the determination unit 104 may determine the rotation range of the camera device 200 based on the mounting state of the pair of handheld units 400 and the direction of gravity with respect to the camera device 200.

Figure 7:
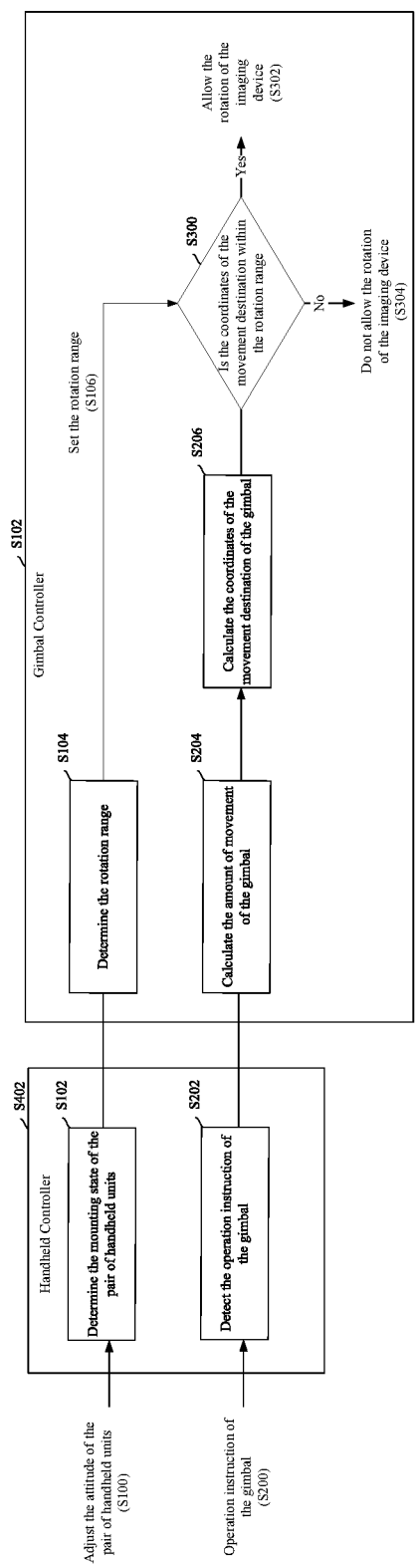
FIG. 7 is a flowchart illustrating an example of a sequence of a rotation control of a camera device by using a gimbal according to an embodiment of the present disclosure.

FIG. 7 is a flowchart illustrating an example of a sequence of a rotation control of the camera device 200 by using the gimbal 100 according to an embodiment of the present disclosure The user may adjust the attitude of the pair of handheld units 400 based on the shooting mode (S100). For example, in the handheld mode, the user may set the pair of handheld units toward the yaw axis direction as shown in FIG. 2. In the fixed mode, the user may set the pair of handheld units toward the roll axis direction as shown in FIG. 3. The sensor 408 may detect the mounting state of the pair of handheld units 400 (S102). The determination unit 103 may determine the mounting state of the pair of handheld units 400 based on the detection signal from the sensor 408. The determination 104 may determine the rotation range of the camera device 200 based on the mounting state of the pair of handheld units 400 determined by the determination unit 103 (S104). In addition, the determination unit 104 may set the rotation range of the camera device 200 to a coordinate system determined in advance with respect to the gimbal 100 (S106).

When the setting of the shooting mode is completed, the user may perform an operation instruction of the gimbal 100 through the operation unit 404 (S200). For example, the user may perform an operation instruction of the gimbal 100 through the operation unit 404 in order to rotate the camera device 200. The handheld controller 402 may detect the operation instruction of the gimbal 100 through the operation unit 404 (S202). Further, the handheld controller 402 may transmit the operation instruction of the gimbal 100 to the gimbal controller 102 through the main controller 300. The gimbal controller 102 may calculate the amount of movement (e.g., the amount of rotation) of the gimbal 100 based on the operation instruction (S204). Further, the gimbal controller 102 may calculate the coordinates of the movement destination of the gimbal 100 in the coordinate system of the gimbal 100 based on the amount of movement of the gimbal 100 (S206). The rotation controller 105 may determine whether the coordinates of the movement destination exist within the rotation range set by the coordinate system (S300). On one hand, when the coordinates of the movement destination are within the rotation range, the rotation controller 105 may allow the rotation of the camera device 200 caused by the gimbal 100 based on the user operation instruction (S302). On the other hand, when the coordinates of the movement destination are not within the rotation range, the rotation controller 105 may not allow the rotation of the camera device 200 caused by the gimbal 100 based on the user operation instruction (S304).

Therefore, by using the process described above, the rotation range of the camera device 200 may be adjusted based on the mounting state of the pair of handheld units 400. As such, it may be possible to prevent the camera device 200 from colliding with the pair of handheld units 400 due to excessive rotation of the camera device 200, or the pair of handheld units 400 from being captured in an image captured by the camera device 200, or the user operating the camera device 200 from being captured in the image.

In some embodiments, the rotation range of the camera device 200 may be adjusted based on the mounting state of the pair of handheld units 400 and the display device 500. As such, it may be possible to prevent the camera device 200 from colliding with the pair of handheld units 400 or the display device 500 due to excessive rotation of the camera device 200, or the pair of handheld units 400 or the display device 500 from being captured in an image captured by the camera device 200, or the user operating the camera system 10 from being captured in the image.

Figure 8:
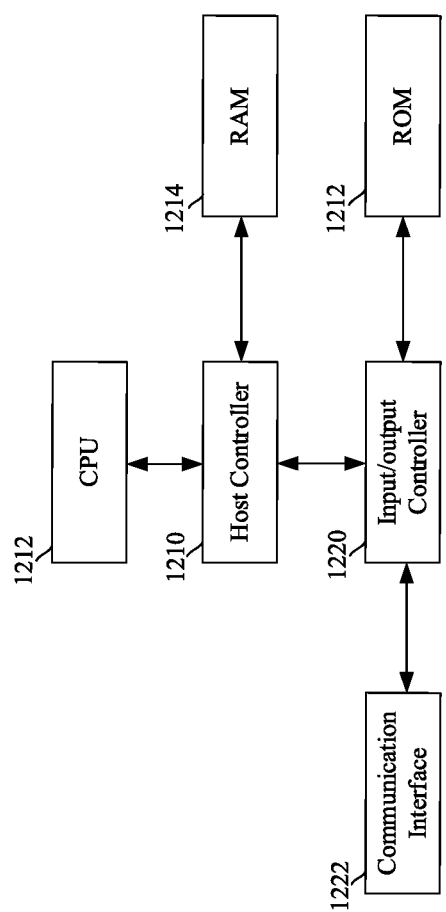
FIG. 8 is a diagram illustrating an example of a hardware configuration according to an embodiment of the present disclosure.

FIG. 8 is a diagram illustrating an example of a computer 1200 that may be configured to implement in whole or in part of the various aspects of the present disclosure. The program installed in the computer 1200 may be configured to cause the computer 1200 to perform the related operations of the device or one or more parts of the device according to the embodiments of the present disclosure. Alternatively, the program may cause the computer 1200 to execute the operation or one or more parts of the operation. The program may cause the computer 1200 to execute the process or the steps of the process related to the embodiments of the present disclosure. The program can be executed by a CPU 1212 in order for the computer 1200 to execute a number of or all of the determination operations associated with the flowcharts and block diagrams of the present disclosure.

As shown in FIG. 8, the computer 1200 includes the CPU 1212 and RAM 1214. The CPU 1212 and the RAM 1214 are connected to each other by a host controller 1210. The computer further includes a communication interface 1222, an input/output unit. The communication interface 1222 and the input/output unit are connected to the host controller 1210 via an input/output controller 1220. The computer 1200 further includes ROM 1230. The CPU 1212 may be configured to operation in accordance with the program stored in the ROM 1230 and the RAM 1214, thereby controlling the respective units.

The communication interface 1222 may communicate with other electronic devices over a network. The hard disk drive can store programs and data for use by the CPU 1212 within the computer 1200. The ROM 1230 may store a boot program or the like executed by the computer 1200 at the time of boot up and/or a program dependent on the hardware of the computer 1200. The program may be provided by a computer readable recording medium such as a CD-ROM, a USB memory, or an IC card. Further, the program may be installed in the RAM 1214 or the ROM 1230, which may be an example of the computer readable recording medium, and executed by the CPU 1212. The information processing described within these programs may be read by the computer 1200 to cause cooperation between the programs and the various types of hardware resources. In some embodiments, device or method may be constructed by realizing the operation or processing of the information by using the computer 1200.

For example, when the communication is performed between the computer 1200 and an external device, the CPU 1212 can execute a communication program loaded on the RAM 1214 and instruct the communication interface 1222 to perform a communication processing based on the processing described in the communication program. Under the control of the CPU 1212, the communication interface 1212 may read the transmission data stored in a transmission buffer included in the recording medium such as the RAM 1214 or the USB memory, then transmit the read transmission data to the network, or write the received data received through the network to a reception buffer or the like included in the recording medium.

Moreover, the CPU 1212 may read all or a part of files or databases stored in an external recording medium such as a USB memory into the RAM 1214 and perform various types of processing on the data on the RAM 1214. Subsequently, the CPU 1212 may write the processed data back to the external recording medium.

Various types of information such as various types of programs, data, tables, and databases can be stored in a recording medium and subjected to information processing. The CPU 1212 can perform various types of processing on the data read from the RAM 1214 and write the results back into the RAM 1214. In some embodiments, the various types of processing may include various types of operations, information processing, conditional determinations, conditional branches, unconditional branches, retrieval/replacement of information, etc. specified by the instruction sequence of the program as described elsewhere in the present disclosure. In addition, the CPU 1212 can retrieve information in a file, a database, and the like in the recording medium. For example, when multiple entries having an attribute value of a first attribute related to an attribute value of a second attribute are stored in the recording medium, the CPU 1212 can retrieve an entry corresponding to the condition specified by the attribute value of the first attribute from the multiple entries and read the attribute value of the second attribute stored in the entry, thereby obtaining the attribute value of the second attribute related to the first attribute that satisfies the predetermined condition.

The program or software modules described above can be stored on the computer 1200 or in a computer readable storage medium similar to the computer 1200. In addition, a recording medium such as a hard disk or a RAM included in a server system connected to a dedicated communication network or the Internet can be used as the computer readable storage medium. As such, the program can be provided to the computer 1200 through the network.

The technical solutions of the present disclosure have been described by using the various embodiments mentioned above. However, the technical scope of the present disclosure is not limited to the above-described embodiments. It should be obvious to one skilled in the art that various modifications and improvements may be made to the embodiments. It should also obvious from the scope of claims of the present disclosure that thus modified and improved embodiments are included in the technical scope of the present disclosure.

As long as the "before," "previous," etc. are not specifically stated, and as long as the output of the previous processing is not used in the subsequent processing, the execution order of the processes, sequences, steps, and stages in the devices, systems, programs, and methods illustrated in the claims, the description, and the drawings may be implement in any order. For convenience, the operation flows in the claims, description, and drawing have been described using terms such as "first," "next," etc., however, it does not mean these steps must be implemented in this order.

DESCRIPTION OF THE REFERENCE NUMERALS

10 Camera system
100 Gimbal
102 Gimbal controller
103 Determination unit
104 Determination unit
105 Rotation controller
106 Determination unit
112 Yaw axis drive
114 Yaw axis drive unit
116 Yaw axis rotation mechanism
122 Pitch axis drive
124 Pitch axis drive unit
126 Pitch axis rotation mechanism
132 Roll axis drive
134 Roll axis drive unit
136 Roll axis rotation mechanism
200 Camera device
202 Camera unit
204 Camera controller
206 Camera element
208 Memory
210 Position sensor
212 Lens unit
214 Camera controller
216 Lens
300 Main controller
302 Memory
400 Handheld units
402 Handheld controller
403 Light-emitting unit
404 Operation unit
405 Light-receiving unit
406 Handheld rotation mechanism
407 Reflector
408 Sensor
408A Light reflector
408B Photo interrupter
409 Light blocking wall
410 Support mechanism
412 Rod member
414 Rod member
420 Handheld device
500 Display device
502 Touch screen display
1200 Computer
1210 Host controller
1212 CPU
1214 RAM
1220 Input/output controller
1222 Communication interface
1230 ROM

What is claimed is:

1. A control device configured to control a rotation mechanism to rotatably hold a camera device, comprising a processor configured to execute a program to:
   determine a mounting state of a mounting member mounted on a support mechanism supporting the rotation mechanism, including:
   determining whether the mounting member is being mounted on the support mechanism as the mounting state of the mounting member;
   determine a rotation range of the camera device coupled to the rotation mechanism based on the mounting state of the mounting member, including:
   determining the rotation range as a first rotation range in case where the processor determines the mounting member is being mounted on the support mechanism; and
   determining the rotation range as a second rotation range in case where the processor determines the mounting member is not being mounted on the support mechanism; and
   control a rotation of the camera device based on the rotation range determined.

2. The control device of claim 1, wherein the processor is further configured to execute the program to:
   determine the mounting member is supported in a first attitude or a second attitude with respect to the support mechanism as the mounting state of the mounting member;
   determine the rotation range as a third rotation range in case where the processor determines the mounting member is being supported in the first attitude with respect to the support mechanism; and
   determine the rotation range as a fourth rotation range in case where the processor determines the mounting member is being supported in the second attitude with respect to the support mechanism.

3. The control device of claim 1, wherein:
   the mounting member includes a handheld device.

4. The control device of claim 3, wherein:
   the handheld device is a pair of handheld units being mounted on the support mechanism with the rotation mechanism disposed in between the pair of handheld units.

5. The control device of claim 1, wherein:
   the mounting member includes a display device.

6. The control device of claim 5, wherein:
   the display device is being mounted on the support mechanism on a side opposite to a side on which a lens unit of the camera device is disposed.

7. The control device of claim 1, wherein:
   the mounting member includes a handheld device and a display device.

8. The control device of claim 7, wherein:
   the handheld device is a pair of handheld units being mounted on the support mechanism with the rotation mechanism disposed in between the pair of handheld units, and the display device is being mounted on the support mechanism on a side opposite to a side on which a lens unit of the camera device is disposed.

9. The control device of claim 1, wherein:
the camera device includes a detachably mounted lens unit,
the processor is further configured to execute the program to:
  determine a type of the lens unit mounted on the camera device; and
  determine the rotation range based on the type of the lens unit.

10. The control device of claim 1, wherein:
the rotation mechanism is detachably mounted on the support mechanism,
the processor is further configured to execute the program to:
  determine a type of the rotation mechanism mounted on the support mechanism; and
  determine the rotation range based on the type of the rotation mechanism.

11. The control device of claim 1, wherein:
the camera device includes a detachably mounted lens unit,
the rotation mechanism is detachably mounted on the support mechanism,
the processor is further configured to execute the program to:
  determine one or more of a type of the lens unit mounted on the camera device and a type of the rotation mechanism mounted on the support mechanism; and
  determine the rotation range based on the one or more of the type of the lens unit or the type of the rotation mechanism.

12. The control device of claim 1, wherein:
the camera device includes a zoom lens,
the processor is further configured to execute the program to:
  determine a position of the zoom lens; and
  determine the rotation range based on the position of the zoom lens.

13. The control device of claim 1, wherein the processor is further configured to execute the program to:
  determine a direction of gravity with respect to the camera device; and
  determine the rotation range based on the direction of gravity.

14. The control device of claim 1, wherein:
the rotation mechanism rotatably supports the camera device centering on a first axis, and
the processor is further configured to execute the program to determine the rotation range of the camera device centered on the first axis as the rotation range.

15. The control device of claim 14, wherein:
the rotation mechanism further rotatably supports the camera device centering on a second axis, and
the processor is further configured to execute the program to determine the rotation range of the camera device centered on the second axis as the rotation range.

16. A control method, comprising:
determining a mounting state of a mounting member mounted on a support mechanism supporting a rotation mechanism, including:
  determining whether the mounting member is being mounted on the support mechanism as the mounting state of the mounting member;
determining a rotation range of a camera device coupled to the rotation mechanism based on the mounting state of the mounting member, including
  determining the rotation range as a first rotation range in case where the processor determines the mounting member is being mounted on the support mechanism; and
  determining the rotation range as a second rotation range in case where the processor determines the mounting member is not being mounted on the support mechanism; and
controlling a rotation of the camera device based on the rotation range.

17. The method of claim 16, wherein:
determining the mounting state of the mounting member further includes:
  determining the mounting member is supported in a first attitude or a second attitude with respect to the support mechanism as the mounting state of the mounting member; and
determining the rotation range of the camera device further includes:
  determining the rotation range as a third rotation range in case where the processor determines the mounting member is being supported in the first attitude with respect to the support mechanism; and
  determining the rotation range as a fourth rotation range in case where the processor determines the mounting member is being supported in the second attitude with respect to the support mechanism.

18. The method of claim 16, wherein:
the mounting member includes a handled device.

19. A control device configured to control a rotation mechanism to rotatably hold a camera device including a detachably mounted lens unit, comprising a processor configured to execute a program to:
  determine a mounting state of a mounting member mounted on a support mechanism supporting the rotation mechanism;
  determine a type of the lens unit mounted on the camera device;
  determine a rotation range of the camera device coupled to the rotation mechanism based on the mounting state of the mounting member and the type of the lens unit; and
  control a rotation of the camera device based on the rotation range determined.

20. A control device configured to control a rotation mechanism detachably mounted on a support mechanism to rotatably hold a camera device, comprising a processor configured to execute a program to:
  determine a mounting state of a mounting member mounted on the support mechanism supporting the rotation mechanism;
  determine a type of the rotation mechanism mounted on the support mechanism;
  determine a rotation range of the camera device coupled to the rotation mechanism based on the mounting state of the mounting member and the type of the rotation mechanism; and
  control a rotation of the camera device based on the rotation range determined.

21. A control method, comprising:
  determining a mounting state of a mounting member mounted on a support mechanism supporting a rotation mechanism;

determining a type of a detachably mounted lens unit mounted on a camera device rotatably held by the rotation mechanism;

determining a rotation range of the camera device based on the mounting state of the mounting member and the type of the lens unit; and controlling a rotation of the camera device based on the rotation range.

22. A control method, comprising:

determining a mounting state of a mounting member mounted on a support mechanism supporting a rotation mechanism detachably mounted on the support mechanism;

determining a type of the rotation mechanism mounted on the support mechanism;

determining a rotation range of a camera device coupled to the rotation mechanism based on the mounting state of the mounting member and the type of the rotation mechanism; and controlling a rotation of the camera device based on the rotation range.

* * * * *